(12) United States Patent
Horrocks et al.

(10) Patent No.: US 7,844,699 B1
(45) Date of Patent: Nov. 30, 2010

(54) WEB-BASED MONITORING AND CONTROL SYSTEM

(76) Inventors: William L. Horrocks, 25 Indian Spring Rd., Media, PA (US) 19063; Fabian Gregory Guerra, 40 White Meadow Rd., Hillsborough, NJ (US) 08844

( * ) Notice: Subject to any disclaimer, the term of this patent is extended or adjusted under 35 U.S.C. 154(b) by 1077 days.

(21) Appl. No.: 11/073,553

(22) Filed: Mar. 7, 2005

Related U.S. Application Data

(60) Provisional application No. 60/624,630, filed on Nov. 3, 2004.

(51) Int. Cl.
*G06F 15/173* (2006.01)
(52) U.S. Cl. .................................................. 709/224
(58) Field of Classification Search ............. 709/223, 709/224, 225; 700/9, 10, 11, 12, 13; 719/318
See application file for complete search history.

(56) References Cited

U.S. PATENT DOCUMENTS

| | | | |
|---|---|---|---|
| 6,477,667 B1 * | 11/2002 | Levi et al. ...................... 714/57 |
| 6,480,901 B1 * | 11/2002 | Weber et al. ................. 709/246 |
| 6,680,730 B1 * | 1/2004 | Shields et al. ................ 345/169 |
| 6,891,838 B1 * | 5/2005 | Petite et al. .................. 370/401 |
| 7,136,709 B2 * | 11/2006 | Arling et al. ................... 700/65 |
| 7,187,986 B2 * | 3/2007 | Johnson et al. ............... 700/17 |
| 7,305,680 B2 * | 12/2007 | Fairhurst et al. ............. 719/318 |
| 2002/0078259 A1 * | 6/2002 | Wendorf et al. ............. 709/328 |
| 2002/0111698 A1 * | 8/2002 | Graziano et al. .............. 700/17 |
| 2005/0216564 A1 * | 9/2005 | Myers et al. ................. 709/206 |

OTHER PUBLICATIONS

Minor Gordon, Agent-Client Interaction in a Web-based E-Commerce System, 2002, Scientific Annals of Computer Science, vol. XI, 2002, pp. 1-10.*

* cited by examiner

*Primary Examiner*—Asad M Nawaz
*Assistant Examiner*—Esther Benoit
(74) *Attorney, Agent, or Firm*—Lewis & Baldwin PLLC; Michael D. Baldwin, Esq.

(57) ABSTRACT

An event driven, network enabled off-site management listening system ("Listener") manages remote devices by listening to unsolicited events communicated from devices connected to the Internet, and from a Mission Controller. The Listener listens for messages, decrypts them, and writes the message to the message queue where a Message Decoder retrieves the message. The Message Decoder decodes the messages and updates the database with location and device specific status information. The Listener also takes messages from the Mission Controller to be executed in a specific sequence, and transmits those messages over the Internet to the specific locations and devices as specified by the Mission Controller. Web-based applications allow end users to monitor and control any device or component connected to the Home Central system from any Internet-enabled device or public communications network.

15 Claims, 6 Drawing Sheets

| | |
|---|---|
| Kitchen Motion | Faulted — Today 08:09 AM |
| Kitchen Motion | Faulted — Today 08:09 AM |
| Porch/Back Doors | Faulted — Today 08:09 AM |
| Kitchen Motion | Faulted — Today 08:08 AM |
| Kitchen Motion | Faulted — Today 08:08 AM |
| Kitchen Motion | Faulted — Today 08:08 AM |
| Kitchen Motion | Faulted — Today 08:07 AM |
| Kitchen Motion | Faulted — Today 08:05 AM |
| Foyer Motion | Faulted — Today 08:05 AM |
| Kitchen Motion | Faulted — Today 08:05 AM |
| Porch/Back Doors | Ready — Today 08:05 AM |
| Kitchen Motion | Faulted — Today 08:05 AM |
| Kitchen Motion | Faulted — Today 08:05 AM |
| Kitchen Motion | Faulted — Today 08:04 AM |
| Kitchen Motion | Faulted — Today 08:04 AM |
| Kitchen Motion | Faulted — Today 08:04 AM |
| Kitchen Motion | Faulted — Today 08:04 AM |
| Kitchen Motion | Faulted — Today 08:04 AM |
| Kitchen Motion | Faulted — Today 08:04 AM |
| Kitchen Motion | Faulted — Today 08:03 AM |
| Kitchen Motion | Faulted — Today 08:03 AM |
| Kitchen Motion | Faulted — Today 08:02 AM |
| Front/Garage Doors | Ready — Today 08:01 AM |
| Front/Garage Doors | Faulted — Today 08:00 AM |
| Foyer Motion | Faulted — Today 08:00 AM |
| Kitchen Motion | Faulted — Today 07:59 AM |
| Kitchen Motion | Faulted — Today 07:59 AM |
| Foyer Motion | Faulted — Today 07:59 AM |
| Foyer Motion | Faulted — Today 07:59 AM |
| Kitchen Motion | Faulted — Today 07:59 AM |
| Front/Garage Doors | Ready — Today 07:56 AM |
| Front/Garage Doors | Faulted — Today 07:56 AM |
| Front/Garage Doors | Ready — Today 07:55 AM |
| Front/Garage Doors | Faulted — Today 07:54 AM |
| Front/Garage Doors | Ready — Today 07:51 AM |
| Front/Garage Doors | Faulted — Today 07:51 AM |
| Kitchen Motion | Faulted — Today 07:50 AM |
| Porch/Back Doors | Faulted — Today 07:35 AM |
| Foyer Motion | Faulted — Today 07:35 AM |
| Kitchen Motion | Faulted — Today 07:35 AM |
| Front/Garage Doors | Ready — Today 07:34 AM |
| Front/Garage Doors | Faulted — Today 07:34 AM |
| Kitchen Motion | Faulted — Today 07:33 AM |
| Kitchen Motion | Faulted — Today 07:33 AM |
| Kitchen Motion | Faulted — Today 07:16 AM |
| Kitchen Motion | Faulted — Today 07:16 AM |
| Kitchen Motion | Faulted — Today 07:13 AM |
| Home | Ready — Today 09:26 AM |
| Home | Disarmed — Today 06:00 AM |
| Foyer Motion | Bypassed — Jun. 30 11:00 PM |
| Kitchen Motion | Bypassed — Jun. 30 11:00 PM |
| Home | Armed Stay — Jun. 30 11:00 PM |
| Home | Armed Away — Jun. 30 11:00 PM |
| Kitchen Motion | Faulted — Jun. 30 10:53 PM |

FIG. 3

WEB-BASED MONITORING AND CONTROL SYSTEM

BACKGROUND OF THE INVENTION

1. Field of Invention

The present invention relates to residential and small business management systems, and more particularly, to integrated management solutions having networking, security, automation, monitoring, energy management, web-enabled applications, IP devices and remote access capabilities.

2. Description of Related Art

Advances in consumer electronics, home networking, network-enabled devices and wireless technologies have brought significant new capabilities to home and small business owners. While these devices perform everything from high speed Internet access to video surveillance to automation to digital entertainment, users are confronted with islands of technology and multiple applications to learn and manage. It would be beneficial to integrate these devices and systems into a single, easy-to-use platform.

Conventional security systems, home automation, energy management and other stand-alone systems, use a written intelligence device that sits on the premises of every residence using the service. This conventional system generally communicates with the user via the user's PC, or it connects to a service provider's gateway so that the user then has to connect to the provider's servers, which then basically mirrors what is going on in the house. In the case of a PC or automation control the server that manages and operates the system is dedicated on-site. It would be beneficial to provide a monitoring & control platform that manages the operations of multiple devices and systems at one or multiple residence locations, and provides reliable remote access via multiple end-user devices.

BRIEF SUMMARY OF THE INVENTION

The preferred embodiments of the invention include an event driven, network enabled management listening system ("Listener") which manages remote devices by listening to unsolicited events communicated from devices connected to the Internet, and from a Mission Controller. An off-site Home Central system incorporates the Listener, a Message Decoder and a Mission Controller. The Listener listens for messages, decrypts them, and writes the message to the message queue, where the Message Decoder retrieves the message. The Message Decoder decodes the messages and updates the database with location and device specific status information. Using this approach, the Listener is freed up to do nothing but listen, decrypt and transfer messages at the protocol layer, so that it can perform these tasks very quickly. The Listener also takes messages from the Mission Controller, which creates of series of messages to be executed in a specific sequence, and transmits those messages over the Internet to the specific locations and devices as specified by the Mission Controller. Web-based applications allow end users to monitor and control any device or component connected to the Home Central system from any Internet-enabled device or public communications network. The Listener supports UDP and TCP communications, and various technologies and tools, including but not limited to C#, Microsoft, SQL server, Microsoft.NTT framework, and MSMQ.

The Listener provides at least two distinct functions. First it handles and manages the overall connection lifecycle between a network system and remote devices located in a dwelling. The devices may include at least a residential or business security system, a climate control device, a lighting automation control interface, one or more cameras, and other IP-enabled devices. Second, the Listener processes missions that are ready for execution by monitoring messages indicating an occurrence of an event and transmitting device specific messages associated with the event to a corresponding device to perform the mission according to the device specific messages.

Further scope of applicability of the present invention will become apparent from the detailed description given hereinafter. However, it should be understood that the detailed description and specific examples, while indicating preferred embodiments of the invention, are given by way of illustration only, and that the invention is not limited to the precise arrangements and instrumentalities shown, since the invention will become apparent to those skilled in the art from this detailed description.

BRIEF DESCRIPTION OF SEVERAL VIEWS OF THE DRAWINGS

The following detailed description of preferred embodiments of the invention will be better understood when read in conjunction with the following drawings, in which like-referenced numerals designate like elements, and wherein:

FIG. 3 is an exemplary listing of communications in accordance with the preferred embodiments;

DETAILED DESCRIPTION OF THE INVENTION

Figure 1:
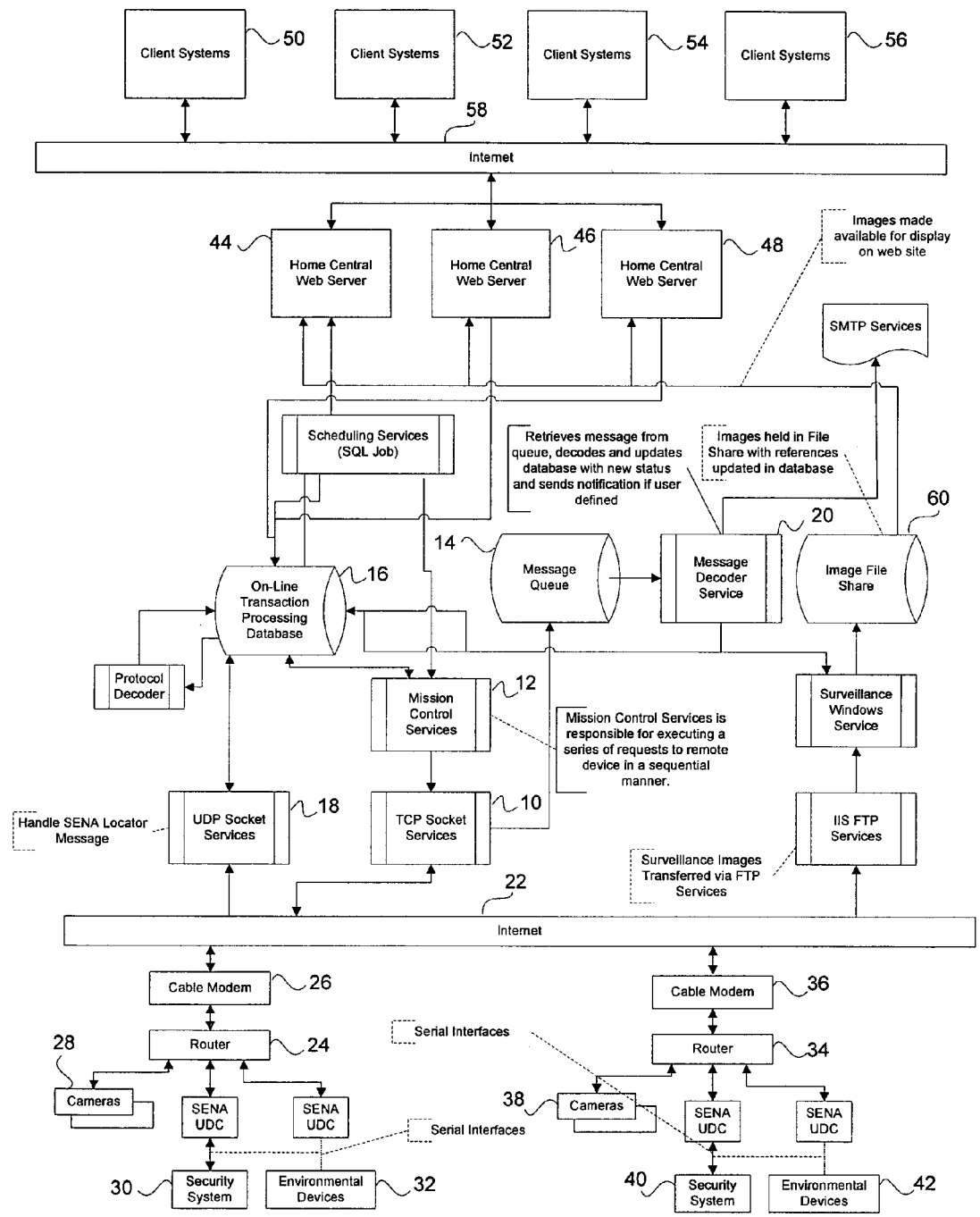
FIG. 1 is an architectural diagram of a home central management system in accordance with the preferred embodiments.

In order for the Listener to manage the connections, it must first get a list of active ports and protocols to listen for. The list of active ports and protocols is stored in a relational database, such as an online transaction processing database, and is retrieved when the service begins. For each UDP and TCP port, a new locator/receiver and listener class is created, respectively. The class then creates a socket to begin listening for incoming messages. The port and protocol combination is linked to a specific device type. For example, the Listener may be configured to associate all TCP messages on port 120 to an environmental device (e.g., Aprilaire thermostats).

As the messages are received, device specific handshaking is processed. For example, a GE NetworkX device can be configured to require an acknowledgment of receipt of messages sent. If the acknowledgment is not received, the Listener will transmit again. Once the handshaking is completed, the message, along with data to determine the site of origin (e.g., the device sending the message) is stored in a private message queue for processing by a decoder. This decoder derives the current state or setting of the device or one of its child devices. The Listener continues to keep the socket open until no related messages are transmitted and the socket is closed by the remote system (e.g., device).

The mission functionality allows the Listener to direct device specific messages to the remote locations. This functionality allows the Listener to control the devices at the remote locations while the listener is on site. One example of mission functionality is the ability to change the current state of an alarm system in a residential house.

While not being limited to a particular theory, the Listener polls the database (e.g., online transaction processing database) periodically (e.g., every tenth of a second) to determine if a mission is ready for processing. Once a mission is ready, the message of the mission is translated into the remote device's protocol and transmitted to the device. Missions are usually a multiple step process, with each step having a set or predetermined number of retries and a time out window. Preferably, if any one step fails or exceeds the retry or time out limits, the mission fails. An example of a multiple step mission is to arm a security system while bypassing one or more zones within the house. The Listener preferably would first transmit the individual zone bypass command or commands, and then send the arm command to the panel. As an alternative, the listener would first send the "arm" command, and then send the desired bypass commands. Once all steps of the mission have completed without error, the mission is marked as successful.

According to the preferred embodiments, the Listener is part of a network central system running on the broadband network. This is in contrast to conventional security systems, for example, as described above, that use a written intelligence device that sits on the premises of every residence using the conventional security system. The Listener and server are located off site and communicate to the users and their resident devices via the internet. The preferred embodiments treat the Internet like a giant network, by networking the communicating devices in each location as if they are logically sitting off of the server (e.g., the inventor's hosted servers), so that a user can connect directly to the devices in the user's target location regardless of the user's location. That is, the inventor's server can connect directly to the home devices and the user can connect to the devices whether the user is sitting at a home PC or at a remote location across the Internet. The Listener gives the user the ability to treat the devices (e.g., individual components) that are hanging off of the network central system as individual network components instead of, in the conventional arts, as an aggregating point that the user has to go to in order to be able to get information from the individual components or two have multiple, unrelated systems or devices interact with each other.

For example, conventional security systems that employ cameras in the home either mirror their video images through a proprietary gateway to video servers, and then mirror that image back to a user sitting at a computer or deploy separate, stand-alone systems on the premises. The conventional systems have a connection from the cameras to the webservers such that the user can only view their camera via the Internet, which is inefficient. There is an out route for the video going to the servers, and an out route for the user to attach to the servers. The user cannot connect directly to his or her camera.

However, according to the preferred embodiments, the central system includes a server that is an IP device and sits on the edge of the network. The system knows the IP address of the user's camera. A user in his or her residence can connect directly to the camera since the communication does not go through the network. Instead of mirroring off of conventional servers, the home PC computer connects directly to the camera via a router in the home and receives the direct image of the camera. Additionally, the cameras can be configured to respond to other events on the servers such as motion triggered by the security system or other event-driven responses as readily understood by a skilled artisan.

If the home device is a network camera, the preferred system literally connects the home PC to the camera when the user views live video accesses the camera configurations. In the conventional systems, a user sends the command down to a PC or a controller that then translates the protocol and then communicates with the gateway or controller. Instead, the Home Central servers provide the protocol conversions, communicate with the Listener listening to communication on the Internet, and provide services as the on-site aggregation point.

Conventionally, an on-site device, such as a PC or automation controller is required on-site. In contrast, the Home Central system does not require such devices on-site since it houses its application logic on its servers off-site, where it is accessible by the users via the Internet. This approach is more efficient than the conventional systems as it is much easier to upgrade the software since it is hosted on Home Central's servers. However, if a user is sitting in his or her house and wants to access one of the linked devices in that house, the user does not have to go through the Internet to access that device as the device can be accessed directly as well.

For example, the Home Central system knows whether a user is local or remote based on the current IP address of the user's location. Therefore, if the user is connecting to the system from his or her house, the system recognizes the PC's external IP address as the same as the home's IP address and connects the PC directly to the device (e.g., camera, environmental device, security system). However, when the user is remote, such as at the user's office or another house, and the user tries to connect to the device, the system recognizes the remote external IP address as different than the home IP address and requires the user to go across the Internet to attach to the device. Therefore in this Home Central system, the user can connect directly to a device through the network at the user's location, or, if needed, go across the Internet.

While not being limited to a particular theory, the system uses a standard router as its gateway to IP-enabled devices. Preferably, the standard router is used only at the transmission layer (e.g., the TCP/IP layer) and it does not do any protocol conversion or mission control. The router used in the system has no logic in it to control the devices; instead the router only provides standard routing. This is a significant difference in comparison to how conventional systems work in the market today, as the conventional systems rely on an intelligent device to sit at the user's location and function as the traffic cop as well as the protocol converter on-site.

In contrast to a conventional on-site traffic cop/protocol converter, the Home Central system employs a Listener that interprets the transmission packet, figures out what device sent the packet and what protocol to use to decode it. The Listener also decrypts the packet if it is encrypted, and stores it into a database. Therefore, the user's computer and devices can simply send their transmission to the Home Central system in an IP packet.

The Home Central system incorporates both a Listener that listens for, decrypts and queues the missions, and a Mission Controller that handles the processing of the mission in the background. The Listener sends the data to a database accessible to the Mission Controller, and the Mission Controller determines what to do with the data. The Mission Controller decides the relative importance of the mission, for example, if the Mission Controller needs to send a notification on the mission, if the Mission Controller must process the mission immediately, or if the Mission Controller needs to initiate some other action in the system.

Using this preferred approach, the Listener is freed up to do nothing but listen, decode and transfer messages at the protocol layer and at the security layer, so that it can perform these tasks very quickly. The Listener opens and, if needed, decrypts the packet, determines the source of the transmission and its device type and places the message into the message queue where the Message Decoder can decode it and place it into the database.

Conventionally, a message handler sits in the logic of a proprietary piece of equipment that has to go on-site. In contradistinction, the Mission Controller of the Home Central system is placed off-site in the host environment where it can more easily communicate with numerous users (e.g., customers) as well as via multiple communication devices. Moving this intelligent device to the Home Central's hosted environment saves cost to each individual customer and it allows the Home Central system to launch, maintain and support new services to the entire customer base at the same time. For example, updates can be inserted at one location (e.g., the host environment) instead of loaded via a piece of firmware or some other upgrade down onto each customer's individual systems.

The system of the preferred embodiments does not require a local computer to operate and manage the user's security system, energy management, monitoring systems, etc. The Home Central system uses a standard router with a standard configuration. With the router, the system acts like a standard network for a plurality of PCs as desired. However, a PC or home computer is not required to run the system. This provides a benefit for a user that owns a remote residence (e.g., a vacation or second home) and doesn't want to leave a PC home computer on all the time at the remote residence. If a PC at a remote residence having a conventional home monitoring system gets a power hit, the user is not assured that the PC will restart and operate as intended. However, with the preferred home central system, when the power does come back up at the vacation home, the home devices (e.g., cameras, security system, environmental devices) run and reconnect to the router so that the user can connect to all of the devices remotely. That is, according to the preferred embodiments, the user on a client system can interact with the devices of a vacation home through the Internet. In the same manner, a user from a remote client system (e.g., PC) can interact with the home devices of a loved one through the Internet.

Moreover, the preferred system's architectural design provides advantages for the users because the users do not have to open up ports on the router. In other words, the users do not have to manage the router. For example, a user sitting at his or her home can monitor a device, such as a camera that is on the driveway because the user cannot see the driveway from his or her location. During the monitoring, the user is not opening up the router/network to the world, even for a brief time while the user is connecting. Because Home Central's system can control the router and the device, the system can open and close the security holes.

As an example of a multi-step mission, the user's security system may be set to automatically arm at a given time (for example, 11 o'clock p.m.). In order to arm the user's security system, the Mission Controller actually sends several commands down and the Listener listens for certain responses to confirm that the commands have been processed. So, for example, the Mission Controller sends a mission down from the database to arm the home security system. The Listener hears the response that the security system has received the commands and is armed. Then the message controller sends another command down to bypass interior zones. The home security system bypasses or deactivates those interior zones so that an alarm does not go off in the middle of the night if a person walks inside the house, for example, to get a glass of water. In the meantime, the Listener hears responses from the security system that are typically, but not required, to be encrypted. These responses come back into the Listener, which pulls the packet apart decrypts it and places it in the message queue The Listener, Message Decoder and the Mission Controller work at the operating system level with commercial operating systems (e.g., Microsoft). Preferably, the Listener, Mission Decoder and Mission Controller automatically come up when the operating system comes up (e.g. Windows Service). The Listener and Mission Controller constantly communicate with each other, for example, about every tenth of a second. The Mission Controller constantly polls the system to see if there are any events that should trigger a command, and ultimately a message, to be communicated to devices in the field (across the Internet) via the Listener. Meanwhile, the Listener is constantly listening on the Internet to multiple ports for inbound communications. When the Listener finds a communication, the Listener decrypts the packet, if appropriate, identifies the source IP and device type of the message, and then sends the message to the message queue. Therefore, the Listener listens to the Internet for a communications coming in, and also sends communications out.

The Mission Controller monitors the Listener and the database and executes the requests to remote devices in a sequential manner. For example, the Mission Controller remotely arms a residential security system or changes a set point on a commercial thermostat. The Mission Controller continuously looks for queued communications (e.g., missions, request) in the database and communicates with the Listener to forward commands to devices connected to the system. The Listener communicates with the database regarding transactions that come in and communicates directly to the Mission Controller while it also listens to the Internet.

The Listener is unique in that it actually listens on the Internet for unsolicited communications. In other words, it is ready to send or receive communications all the time and in this manner operates as both a client and a server. The Listener gathers the communications from the server or Internet, determines where they come from, what device they are and whether it needs to be decrypted at the security layer. The Listener can break apart the messages it gathers from the Internet into its components so that the message can be queued for the Message Decoder. The Message Decoder retrieves and decodes the messages from the queue and reacts accordingly and immediately (e.g., in less than about a tenth of a second) to place the updated data into the database.

Client systems may include personal computers including but not limited to desktop, laptop, notebook, personal digital assistants (PDAs) cellular phones, etc., that communicate with the Home Central web servers. The web servers communicate with the end-user devices over the Internet. Generally, the only messages that go directly into the back end network (Listener) are messages from the on-site devices. In this manner, the Listener doesn't listen to anything on the back end other than what's coming from the devices. If the user wants to communicate with their personal web pages, the user can go through Home Central's web servers, which are at the front end of the architecture, as will be described in greater detail below.

The Listener listens to the Internet for particular devices on known ports. For example, when a user surfs the Internet, HTTP traffic, for example, comes in port 80. The Listeners don't listen to port 80 unless specific devices require communication via port 80. All user communication is via the front-end web servers, via HTTP protocol over port 80. The web servers listen to port 80 so that when a user makes a request, the web servers go up, query all the databases, and serve up the pages on the front end. On the back end, the Home Central system uses the Internet as a communication network so that all the devices in the user's home or small business can talk to the Listener and send messages to the Listener. These messages do not communicate directly to the front end web servers. The Listener is considered a "back-end" system because it is not directly accessible by the user. Web servers are used to "front-end" the activities of the Listener and Mission Controller for user interaction.

The only way to access the control and monitoring capabilities of the Home Central system is through the Home Central web servers. The users don't connect directly to the back end, they connect to the web servers that then take the information and display it in a way that is easy to understand. Accordingly, there is an Internet front end of the system that allows the user to see their information, and then there is an Internet back end, which enables home devices to communicate with the Home Central servers. The Listener is basically in the middle serving up information that the users can see, and grabbing information from the devices for processing by the Home Central system.

A locator/receiver class or listener class creates a socket to listen for the messages. The socket connects to a physical communication, for example an external communication to the Internet. The Listener creates a socket for it to physically pass data from the network into the servers and then closes the socket when the communication stops.

During operation, the Mission Controller looks for events to process into commands to be sent via the Listener, like a prescheduled event. For example, the Mission Controller creates a series of commands based on found events and sends the messages directly to the Listener for delivery to the appropriate end-user device(s). The Listener polls the database (e.g., online transaction processing database) at the predetermined intervals (e.g., about every tenth of a second) and transmits device specific messages as needed to the remote devices. So, for example, if the Mission Controller has created a series of messages that are ready to go out to a remote device (e.g., a residential security system, environmental devices including lighting and climate control devices, cameras), the Listener grabs the stored message, and sends the message(s) to the correct location (customer and device). The Mission Controller works independently of the Listener and the Message Decoder.

Accordingly, the Listener communicates in both directions by communicating messages from the Mission Controller to the devices and communicating messages from devices to the Home Central system. The Listener also checks, for example, the On-line Transaction Processing Database to ensure that the Mission Controller & Decoder have not erroneously inputted a message into its queue independently of what the Listener was tasked to do. The Listener can respond to the erroneous message, for example, by moving or removing the message. The Mission Controller feeds a mission (e.g., data, messages, tasks, instructions), via the Message Decoder, to the Listener and the Listener immediately processes the message.

Figure 2:
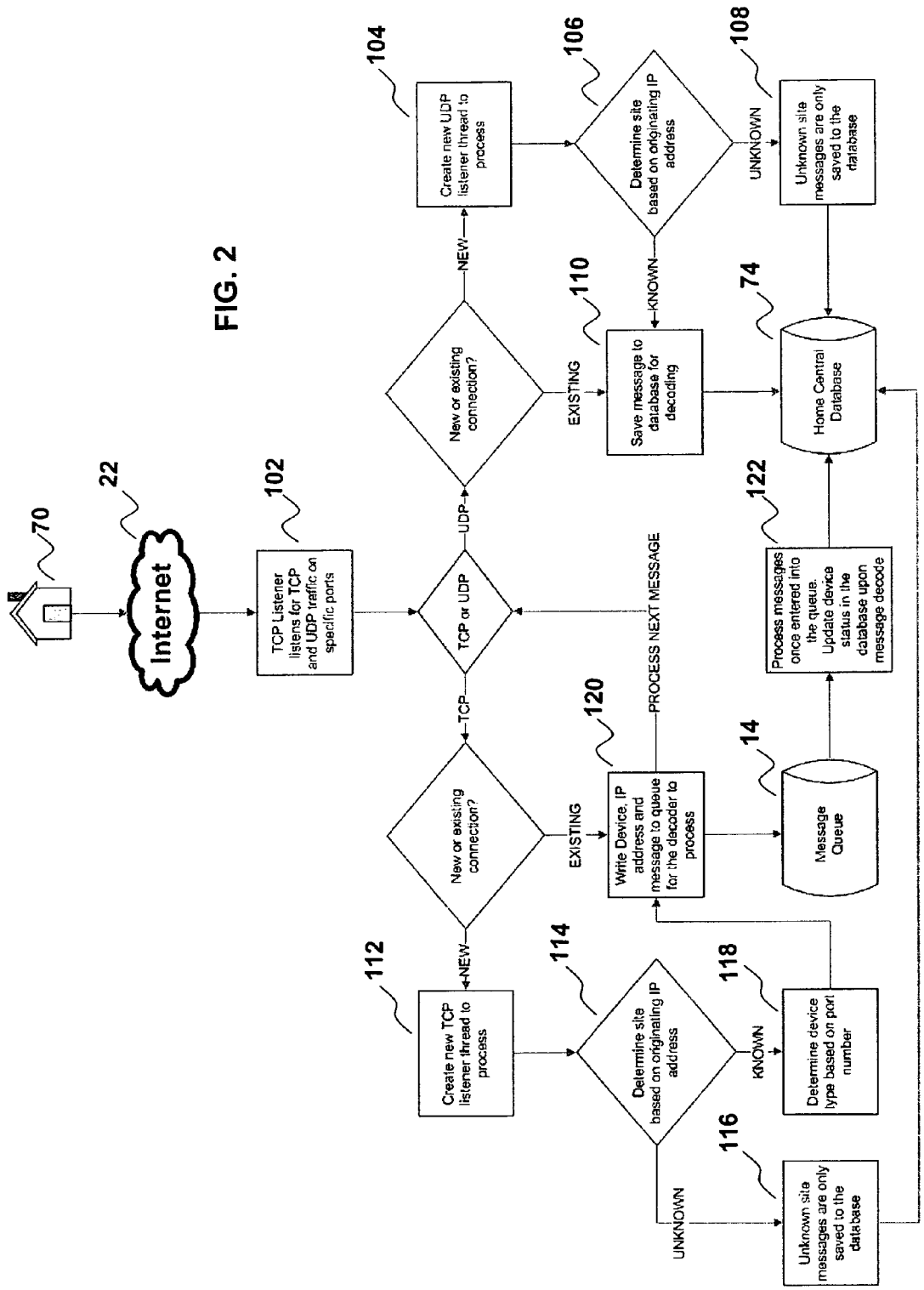
FIG. 2 is a flow diagram illustrating an exemplary operation of the preferred listener upon receipt of a communication from the Internet.

Examples of the preferred embodiments of the Listener are illustrated at FIGS. 1 and 2. FIG. 1 shows an architectural diagram of a residential system monitoring system in accordance with the preferred embodiments. The Listener 5 is identified as including TCP Socket Services 10 in communication with the Mission Controller 12, identified as Mission Control Services. The Mission Controller 12 is responsible for executing missions (e.g., series of requests or instructions) to remote devices in a sequential manner. As can be seen in FIG. 1, the Listener is also in communication with a message queue 14, a Message Decoder 20 and an on-line transaction processing database 16, via the mission controller 12. On incoming communications from devices, the Listener places messages in the message queue 14, from where the Message Decoder 20, identified as a Message Decoder Service, retrieves the messages. The Message Decoder 20 decodes the message and updates the on-line transaction processing database 16 with the new data. Example data includes statuses changes to security systems and include but are not limited to the following: ready, faulted, trouble, disarmed, armed and OK.

The Listener 5 is in communication with field devices via the Internet 22. Still referring to FIG. 1, upon receipt of a message, the Listener 5 forwards the message to the Internet. The listener 5 communicates over the Internet 22 and via a router 24, and a modem 26, to devices including cameras 28, a security system 30 and environmental devices 32. Moreover, the listener 5 also communicates over the Internet 22 and via a router 34, and a modem 36, to devices of another residence, facility or location, including cameras 38, a security system 40 and environmental devices 42. Continuing with the architectural diagram shown in FIG. 1, the Home Central user interface system includes Home Central web servers 44, 46, 48, that store information on and access information from the on-line transaction processing database. Client systems 50, 52, 54, 56 communicate with the web servers via the Internet 58 by accessing the web site associated with the Home Central system. While not being limited to a particular theory, the Home Central system also includes an image file database 60 that stores images captured by cameras 28, 38 at the user's location(s) and made available for display on the Home Central system web site. The images stored in the image file share database 60 have references that are updated as unsolicited images are received from the field.

FIG. 2 is a flow diagram illustrating an exemplary operation of the listener upon receipt of a communication from the Internet. As can be seen in FIG. 2, a home device in a house 70 sends a communication via the Internet 22 to the Home Central system. The Listener 5 listens for Transmission Control Protocol (TCP) and User Datagram Protocol (UDP) traffic on a range of ports over the Internet at step 102. If the traffic is UDP, then the UDP socket services module 72 determines if the connection is new or existing. If the connection is new, then at step 104, the UDP socket services module 18 creates a new listener thread to process, and determines the origin of the transferring site, at step 106, based on its originating Internet Protocol (IP) address. Unknown site messages, meaning messages originating from an unknown site, are saved to a Home Central database 74 (e.g., the on-line transaction processing database 16) at step 108. If the UDP connection is an existing connection, or if the originating site is known, then the communication or message is saved in the Home Central database 74 at step 110 for decoding and processing.

Still referring to FIG. 2, if the traffic is a TCP message, then the Listener 5 determines if the connection is new or existing. If the connection is new, then at step 112, the Listener 5 creates a new listener thread to process, and determines the origin of the transferring site based on its originating IP address, at step 114. In a similar manner to the UDP Socket Services Module 18, the listener saves unknown site messages to the Home Central database 74 at step 116. If the originating site is known, then at step 118 the Listener 5 determines the device type (e.g., camera, security system, environmental device) based on the port number of the originating site. Following step 118, or if the connection is an existing connection, at step 120 the listener 5 writes the device type, IP address and message to the message queue 14 for the Message Decoder 20 to process. At this time the Listener 5 is free to process a next message from the Internet 22. Meanwhile, the Message Decoder 20 decodes messages entered into the message queue 14, updates the status of the associated device and saves the decoded message in the Home Central database 74, at step 122. As can be seen in FIG. 2, once the Listener 5 sends the message, IP address and device type to the message queue 14, the Listener is free to process another message. This enables the Listener 5 to process more messages with greater efficiency than prior protocol socket services because message processing is handled in the Message Decoder 20 allowing the Listener 5 to be freed up to Listen for new messages.

FIG. 3 shows an exemplary listing of communications that have been saved to the home central database 74. The listing includes information from a residential security system 30 during a night (e.g., from June 30 at 10:53 PM) and next morning (e.g., to July 1 "Today" at 8:09 AM). The listing includes a location or type of a specific monitoring unit (e.g., door sensor, motion detector, security control device), a status of that unit and a time stamp of the event that triggered the security system.

Figure 4:
FIG. 4 illustrates an exemplary table of pre-scheduled events that are to be processed in accordance with the preferred embodiments.

FIG. 4 shows an exemplary table of pre-scheduled events that are to be processed by the mission controller. The table includes fields describing the event by, for example, status, name, start time, start action, stop time, stop action and frequency, as is readily understood by a skilled artisan.

Figure 5:
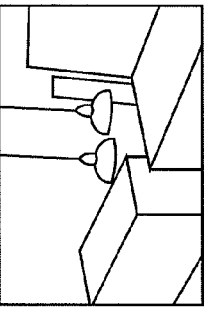
FIG. 5 shows an exemplary illustration of information available to a user communicating remotely from a client system in accordance with the preferred embodiments.

FIG. 5 shows an exemplary illustration of information available to a user communicating remotely from a client system. It is understood that this information could also be available to a user communicating with the Home Central system off the router 24, 34 of a monitored residence. As can be seen in FIG. 5, the available information includes the current status, last status and time of the last status change for the home and its monitoring units/sensors. The information available to the user also includes the current status of environmental devices (e.g., digital thermostat) and cameras in the dwelling. The user can view images of the residence, including triggered images from the monitoring cameras and live video as desired.

Figure 6:
FIG. 6 shows another exemplary preferred illustration of information available to a user communicating remotely from a client system.

FIG. 6 shows another exemplary illustration of information available to a user communicating remotely from a client system. It is further understood that this information could be available to a user communicating with the Home Central system off the router 24, 34 of a monitored residence. The illustration shown in FIG. 6 is similar to the illustration shown in FIG. 5, and includes information available from a home (e.g., monitoring units, cameras, security sensors, energy management environmental devices). As can be seen in FIG. 6, the user can view images of the residence, including triggered images from the monitoring cameras as desired.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention. Without further elaboration the foregoing will so fully illustrate my invention that others may, by applying current or future knowledge, readily adapt the same for use under various conditions of service.

What is claimed is:

1. An off-site network enabled management system that dynamically manages remote residential and commercial devices located in a dwelling by listening to a communication from the remote devices over the Internet, comprising:
   a processor;
   an on-line database that stores missions indicating an occurrence of an event to be processed by the remote devices and stores communications from the remote devices, said on-line database also storing the communications from the remote devices and a status associated with each of the stored communications;
   an offsite listener that listens for the communications over the Internet, said listener receiving an unsolicited communication over the Internet from a remote device in a native protocol of a remote device; said listener adapted to translate the communications, determine the location and type of remote device that originated each of the communications, and store the communications in the on-line database, the remote devices including an IP-enabled device; and
   a message queue and a message decoder, said message queue in communication with said listener and adapted to store the communications received by said listener, said message decoder in communication with said message queue and said on-line database, said message decoder adapted to retrieve said communications from said message queue, decode said communications, and update the status associated with said communication in said on-line database;
   an offsite mission controller that processes the missions stored in the on-line database by executing the missions stored in the on-line database and directing said listener to transmit device specific messages associated with the missions to a corresponding one of the remote devices to perform the mission; said mission controller executing commands either automatically based on user defined rules, or executing commands remotely through real-time end user response to the missions sent by the mission controller.

2. The system of claim 1, wherein the device specific messages include a multiple step process, each step having a predetermined number of allowable retries and a timeout window, wherein the mission fails when the predetermined number of retries is exceeded or the timeout window expires, and the mission succeeds upon completion of each step.

3. The system of claim 1, further comprising a web server for communication with client systems located remotely from the dwelling.

4. The system of claim 1, wherein said listener communicates periodically and determines if a stored mission is ready for processing.

5. The system of claim 1, wherein said mission controller directs said listener to transmit device specific messages by creating commands based on found events and sending those device specific messages to the listener for delivery to the appropriate device and location.

6. The system of claim 1, wherein said listener retrieves a list of active ports and protocols to listen for from said on-line database.

7. The system of claim 6, wherein said mission controller creates a class for each active UDP and TCP port, said class creating a socket to begin listening for incoming messages from the active ports.

8. The system of claim 7, wherein each port and protocol is linked to a specific one of each remote device type.

9. The system of claim 1, wherein the IP-enabled device is a security system including a plurality of alarm zones, and the mission includes changing the current state of less than all of the plurality of alarm zones of the security system.

10. A method for remote users in off-site on-line locations to manage any internet connected, remote devices located in a dwelling comprising:

an on-line database that stores missions indicating an occurrence of an event to be processed by the remote devices and stores communications from the remote devices, said on-line database also storing the communications from the remote devices and a status associated with each of the stored communications;

an offsite listener that listens for the communications over the Internet, said listener receiving an unsolicited communication over the Internet from a remote device in a native protocol of a remote device, without the need for local controllers or other onsite personal computers; said listener adapted to translate the communications, determine the location and type of remote device that originated each of the communications, and store the communications in the on-line database, the remote devices including an IP-enabled device, being one of a security system, an environmental device or a camera; and a message queue and a message decoder, said message queue in communication with said listener and adapted to store the communications received by said listener, said message decoder in communication with said message queue and said on-line database, said message decoder adapted to retrieve said communications from said message queue, decode said communications, and update the status associated with said communication in said on-line database;

storing the communication and an indication of the originating remote device into the message queue.

11. The method of claim 10, after the step of receiving a communication over the internet, further comprising decrypting the communication.

12. The method of claim 10, after the step of receiving a communication over the internet, further comprising creating a new listener thread for the communication.

13. The method of claim 10, further comprising storing the communication into the on-line database.

14. The method of claim 10, before the step of decoding the communication, further comprising receiving a next communication over the Internet from another remote device.

15. The method of claim 10, wherein the step of decrypting the communication into the protocol of the originating remote device that is readable by the management applications.

* * * * *